United States Patent
Proctor et al.

(10) Patent No.: US 10,339,454 B2
(45) Date of Patent: Jul. 2, 2019

(54) BUILDING A HYBRID REACTIVE RULE ENGINE FOR RELATIONAL AND GRAPH REASONING

(71) Applicant: RED HAT, INC., Raleigh, NC (US)

(72) Inventors: Mark Proctor, London (GB); Mario Fusco, Milan (IT)

(73) Assignee: Red Hat, Inc., Raleigh, NC (US)

(*) Notice: Subject to any disclaimer, the term of this patent is extended or adjusted under 35 U.S.C. 154(b) by 688 days.

(21) Appl. No.: 14/990,677

(22) Filed: Jan. 7, 2016

(65) Prior Publication Data

US 2017/0200083 A1 Jul. 13, 2017

(51) Int. Cl.
*G06N 5/02* (2006.01)
(52) U.S. Cl.
CPC .................... *G06N 5/025* (2013.01)
(58) Field of Classification Search
USPC ........................................................... 706/47
See application file for complete search history.

(56) References Cited

U.S. PATENT DOCUMENTS

| | | | | |
|---|---|---|---|---|
| 7,725,571 B1 | 5/2010 | Lewis | | |
| 7,904,402 B2* | 3/2011 | Proctor | ................ | G06N 5/025 706/45 |
| 7,912,801 B2* | 3/2011 | Proctor | ................ | G06N 5/022 706/46 |
| 7,991,727 B2* | 8/2011 | Proctor | ................ | G06N 5/025 706/47 |
| 8,024,281 B2* | 9/2011 | Proctor | ................ | G06N 5/025 706/47 |
| 8,250,525 B2 | 8/2012 | Khatutsky | | |
| 8,271,419 B2* | 9/2012 | Proctor | ................ | G06F 9/547 706/45 |
| 8,314,793 B2 | 11/2012 | Beckman et al. | | |
| 8,315,967 B2* | 11/2012 | Proctor | ................ | G06N 5/025 706/45 |
| 8,352,402 B2* | 1/2013 | Tirelli | ................ | G06N 5/047 706/47 |
| 8,359,287 B2 | 1/2013 | Pucher | | |

(Continued)

OTHER PUBLICATIONS

IEEE Feature-based survey of model transformation approaches, K. Czarnecki & S. Helsen pp. 621-645 IBM Systems Journal ( vol. 45, Issue: 3, 2006 ).*

(Continued)

*Primary Examiner* — Michael B Holmes
(74) *Attorney, Agent, or Firm* — Lowenstein Sandler LLP

(57) ABSTRACT

A processing device executing a rule engine receives a first object. The processing device determines whether the first object is represented by a relational model or an object-oriented model. The first object is determined to be represented by the relational model responsive to the first object lacking a reference to a nested object. The first object is determined to be represented by the object-oriented model responsive to the first object including a reference to a nested object. If the first object is represented by the relational model, a join is performed between the first object and a second object based on a relationship between the objects using a first node. If the first object is represented by the object-oriented model, an expression of the first object is evaluated to navigate to a third object that is a first nested object of the first object using a second node.

20 Claims, 10 Drawing Sheets

(56) References Cited

U.S. PATENT DOCUMENTS

| | | | | |
|---|---|---|---|---|
| 8,417,659 B2* | 4/2013 | Proctor | ............ | G06N 5/025 |
| | | | | 706/48 |
| 8,418,135 B2* | 4/2013 | Proctor | ............ | G06N 5/022 |
| | | | | 717/117 |
| 8,538,905 B2* | 9/2013 | Proctor | ............ | G06N 5/025 |
| | | | | 706/47 |
| 8,589,322 B2* | 11/2013 | Proctor | ............ | G06N 5/047 |
| | | | | 706/45 |
| 8,600,914 B2* | 12/2013 | Proctor | ............ | G06N 5/047 |
| | | | | 706/10 |
| 8,645,296 B2* | 2/2014 | Proctor | ............ | G06N 5/022 |
| | | | | 706/45 |
| 8,712,949 B2* | 4/2014 | Proctor | ............ | G06N 5/025 |
| | | | | 706/48 |
| 8,756,049 B2* | 6/2014 | Proctor | ............ | G06N 5/025 |
| | | | | 703/22 |
| 8,930,297 B2* | 1/2015 | Proctor | ............ | G06N 5/047 |
| | | | | 706/48 |
| 9,009,810 B2 | 4/2015 | Grigoriev et al. | | |
| 9,020,868 B2 | 4/2015 | Elkins et al. | | |
| 9,213,942 B2* | 12/2015 | Proctor | ............ | G06N 5/02 |
| 9,286,570 B2* | 3/2016 | Proctor | ............ | G06N 5/047 |
| 9,361,582 B2* | 6/2016 | Proctor | ............ | G06F 9/547 |
| 10,061,758 B2* | 8/2018 | Anstis | ............ | G06F 17/246 |
| 2003/0200296 A1* | 10/2003 | Lindsey | ............ | H04L 41/5054 |
| | | | | 709/223 |
| 2006/0112061 A1 | 5/2006 | Masurkar | | |
| 2011/0046992 A1 | 2/2011 | Erhard | | |

OTHER PUBLICATIONS

Elsevier Computer Networks vol. 33, Issues 1-6, Jun. 2000, pp. 137-157 Web Modeling Language (WebML): a modeling language for designing Web sites, Stefano Ceri, Piero Fraternali, Aldo Bongio.*

ScienceDirect Trends in Cognitive Sciences vol. 10, Issue 7, Jul. 2006, pp. 309-318 Theory-based Bayesian models of inductive learning and reasoning Joshua B. Tenenbaum, Thomas L. Griffiths, Charles Kemp.*

ACM DL Digital Library Jena: implementing the semantic web recommendations WWW Alt. '04 Proceedings of the 13th international World Wide Web conference on Alternate track papers & posters pp. 74-83 Jeremy J. Carroll et al., New York, NY, USA—May 19-21, 2004.*

ACM Digital Library Hybrid aspects for weaving object-oriented functionality and rule-based knowledge Maja D'Hondt Viviane Jonckers AOSD '04 Proceedings of the 3rd international conference on Aspect-oriented software development pp. 132-140 Mar. 22-24, 2004.*

IEEE Object-oriented development Grady Booch IEEE Transactions on Software Engineering ( vol. SE-12 , Issue: 2 , Feb. 1986) pp. 211-221 IEEE.*

Proctor et al., "Building a Hybrid Reactive Rule Engine for Rational and Graph Reasoning", RuleML2015, Hybrid Relational and Graph Reasoning, Aug. 3, 2015, 49 pages, retrieved from http://www.slideshare.net/MarkProctor/ruleml2015-hybrid-relational-and-graph-reasoning.

JBOSS, Chapter 5. Hybrid Reasoning, 18 pages, retrieved from http://docs.jboss.org/drools/release/latestFinal/drools-docs/html/ch05.html on Sep. 21, 2015.

Varro et al., "Graph Transformation in Relational Database", Department of Computer Science and Information Theory, Electronic Notes in Theoretical Computer Science, vol. 127, Issue 1, Mar. 30, 2005, 11 pages, retrieved from http://cs.bme.hu/~gervarro/publication/grabats2004_vfv.pdf.

Fusco et al., "Building a Hybrid Reactive Rule Engine for Relational and Graph Reasoning", Rule Technologies: Foundations, Tools, and Applications, vol. 9202 of the series Lecture Notes in Computer Science, Jul. 12, 2015, pp. 208-222 (15 pages).

* cited by examiner

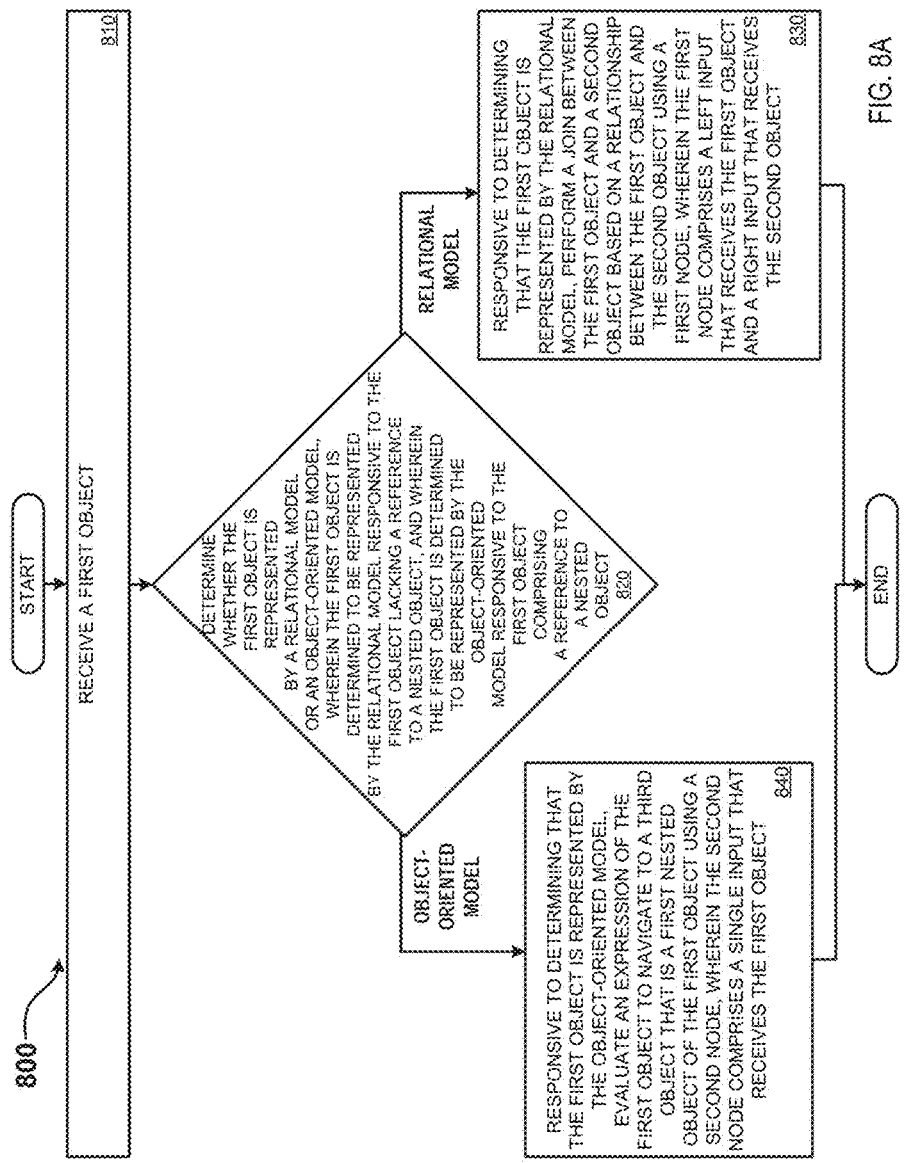

BUILDING A HYBRID REACTIVE RULE ENGINE FOR RELATIONAL AND GRAPH REASONING

TECHNICAL FIELD

Embodiments of the present invention relate to rule engines, and more specifically to a rule engine for relational and graph reasoning.

BACKGROUND

The development and application of rule engines is one branch of Artificial Intelligence (A.I.), which is a research area that focuses on "making computers think like people." Broadly speaking, a rule engine processes information by applying rules to data objects (also known as facts). Various types of rule engines have been developed to evaluate and process rules. One conventional type of rule engine is a Rete rule engine. A Rete rule engine implements a Rete network to process rules and data objects. An object is compared against each of the rules in a rule set to determine whether the object satisfies all of the constraints of any of the rules. An object that satisfies all of the constraints associated with a rule may be updated based on an action associated with that rule.

Data sets may be represented using relational or object graph reasoning. A conventional rule engine is used to build a system that provides a relational view over a data set. Data sets represented using relational reasoning include multiple objects that may be related to one or more other objects. Objects may thus have a one-to-one relationship to another object or a one-to-many relationship to other objects. In relational reasoning, no hierarchy exists between objects. Data structures used to represent objects in a relational model are referred to as being flat, as no one object is hierarchically higher or lower than another object.

For Object-Oriented (OO) systems, an object-oriented model is used that implements object graph reasoning. An exemplary OO system is JAVA®. In JAVA®, graph-like data structures are used to represent objects. A graph or graph-like data structure (also known as a hierarchical data structure) represents a data structure of a graph. A graph may represent a set of objects, where pairs of objects may be connected by links. The objects may be referred to as vertices, nodes, or points and the links may be referred to as edges or arcs. A graph-like data structure may be a data structure that may implement graph concepts in mathematics, for example. A graph or graph-like data structure may include a finite set of vertices (or nodes or points). One object may have a one-to-one relationship to another object or a one-to-many relationship to other objects. In an object-oriented model, a hierarchy may exist between objects. For example, an object may be nested within another object.

Objects that rely on graph-like data structures may not be input into traditional rule engines (which process objects represented by a relational model) unless the objects are flattened. After the objects are flattened and hierarchical relationships are replaced by non-hierarchical relationships, the rule engine may reason over the flattened objects. Flattening of objects that rely on graph-like data structures for use by rule engines may be a time and resource consuming process. Thus, developers that use objects that rely on graph-like data structures in rule engines may dedicate a great amount of time and/or resources in order to flatten the objects.

BRIEF DESCRIPTION OF THE DRAWINGS

The present invention is illustrated by way of example, and not by way of limitation, in the figures of the accompanying drawings and in which:

FIG. 8A illustrates one embodiment of a method to determine whether an object is represented by a relational model or an object-oriented model.

DETAILED DESCRIPTION

Figure 1:
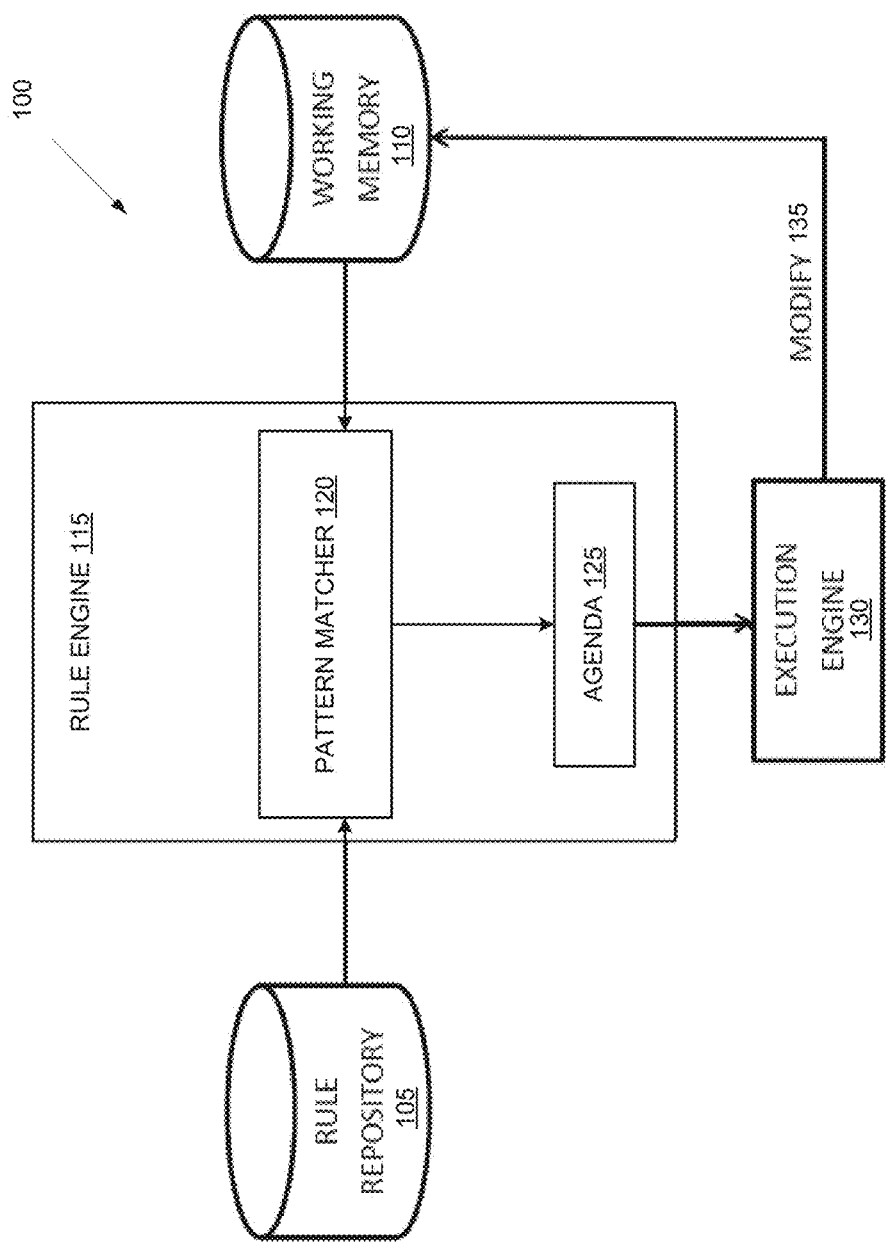
FIG. 1 illustrates an example system that implements a rule engine.

Described herein are some embodiments of a hybrid reactive rule engine that supports both objects that are represented by relational models and objects that are represented by object-oriented (or graph) models. The hybrid reactive rule engine allows objects that are represented by an object-oriented model to propagate through a network built by the rule engine without flattening of the objects. The hybrid reactive rule engine also allows objects that are represented by an objected-oriented model to propagate through the same or a different network as objects represented by a relational model.

In an embodiment, a processing device that executes a rule engine receives a first object and determines whether the first object is represented by a relational model/reasoning or a graph model/reasoning. If the first object lacks a reference to a nested object, the first object is determined to be represented by a relational model. The first object may be flat and may not have references to nested objects. Other objects may not be hierarchically higher or lower than the first object. Therefore, no hierarchy exists between the first object and other objects. In response to determining that the first object is represented by the relational model, the processing device performs a join operation between the first object and a second object based on a relationship between the first object and the second object using a first node. The relationship between the first object and the second object may link the two objects. The first node may be set up by the processing device upon setting up a network at a compilation phase of the network (prior to objects being propagated within nodes of the network). The first node may be a join node. The first node includes a left input that receives the first object and a right input that receives the second object.

If the first object includes a reference to a nested object, the first object is determined to be represented by the object-oriented model. The first object may have a hierarchical relationship with other objects and specifically, the first object may include a reference to a nested object. In response to determining that the first object is represented by the object-oriented model, the hybrid reactive rule engine evaluates an expression of the first object to navigate to a third object that is a nested object of the first object using a second node. The second node includes a single input that receives the first object in the network. The second node may called a "from" node. The second node may have a single left input (and not a right input). Therefore the second node may be different than the first node, which has both a left input and a right input.

A hybrid rule engine that can support and process objects represented by an object-oriented model (e.g., objects that have hierarchical relationship with other objects and reference nested objects) as well as objects represented by a relational model may provide several advantages. Objects represented by an object-oriented model relate to other objects by references. For example, a class for a telephone book directory may list the objects "person", "address" and "road". The road object may be a nested object of the address object and the address object may be a nested object of the person object. The nested relationships between objects may be shown in a simple manner. Therefore, a hybrid rule engine that supports objects represented by an object-oriented model may use references to nested objects to interpret relationships between objects without flattening the objects. By directly interpreting objects represented by an object-oriented model (such as objects represented by the JAVA® system), the hybrid rule engine may save time and resources as opposed to conventional rule engines which may require such objects to be flattened to be represented by a relational model prior to processing the objects.

Moreover, the hybrid rule engine also supports objects represented by a relational model as well as objects represented by an object-oriented model. Therefore, a single rule engine may be used for objects represented by two different models.

Additionally, the hybrid rule engine may be a reactive rule engine that also handles reactivity of objects. Reactivity of an object refers to a change in an object. The change may affect the immediate object and any related objects (such as objects that are nested objects of the changed object). In the above example, suppose that a person that previously resided at one address moves and now resides at a different address. Due to the change in the person's address, the "road" object changes which causes an update to the "address" object as well as the "person" object. Therefore, the hybrid reactive rule engine may also provide reactivity to objects that are represented by an object-oriented model.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions below are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "modifying" or "computing" or "processing" or "determining" or "associating" or the like, refer to the action and processes of a computing device, or similar electronic computing device, that manipulates and transforms data represented as physical (electronic) quantities within the computing device's registers and memories into other data similarly represented as physical quantities within the computing device memories or registers.

A rule engine processes information by applying rules to data objects. A rule engine may execute rules in a runtime product environment to achieve a goal. A rule may include a regulation such as an if-then rule. For example, a rule may state that if a student gets a grade of 70 points or higher, the student should be assigned a passing grade. The rule engine may execute the rule (also referred to as "firing up" the rule) and provide an appropriate outcome.

FIG. 1 illustrates an example system 100 that implements a rule engine 115. The system 100 includes a rule repository 105, a working memory 110 and an execution engine 130, in addition to the rule engine 115. The rule repository 105 (also referred to as a production memory) may include an area of memory and/or secondary storage that includes rules that will be used to evaluate expressions of objects. The rule repository 105 may include a directory of a file system, may be a rule database, may be a table of rules, or may be some other data structure for storing a rule set (also referred to as a rule base). Each rule in the rule set has a left hand side that corresponds to the constraints of the rule and a right hand side that corresponds to an action or actions to perform if the constraints of the rule are satisfied. The working memory 110 stores data objects (also referred to as objects or facts) that have been asserted (e.g., objects that are to be matched against the rule set). Data objects that are received by the rule engine 115 may be added to the working memory 110. Data objects may also be removed from the working memory 110.

The rule engine 115 sets up a network based on the rule set in the rule repository 105. The rule engine 115 may set up the network at a compilation phase of the network or at another time. The network is a network of nodes, where a majority of the nodes correspond to conditions associated with at least one rule from the rule set. Where multiple rules have the same condition, a single node may be shared by the multiple rules. The rule engine may be a Rete rule engine and the network may be a Rete network. A network, such as a Rete network, includes different types of nodes, such as object type nodes (OTN), alpha nodes, beta nodes, left input adapter nodes, evaluation (or eval) nodes, root nodes (also known are Rete nodes), accumulate nodes, not nodes, and rule terminal nodes. A topmost node in a network is a root node. The root node does not have any parent nodes (and thus, has no inputs) and all other nodes in the network stem (either directly or indirectly) from the root node. The root node is a beginning node and may have one or more outputs that are coupled to inputs of other OTN nodes. An OTN node has an input that is coupled to an output of a root node. An OTN node has one output that is coupled to an input of another node. All other nodes in a network may stem from an OTN node (either directly or indirectly), where the OTN node stems from a root node. A rule terminal node is an end or terminal node. A rule terminal node may have a single input but does not have any outputs (as the network terminates at a rule terminal node). An alpha node has one input and one output that may be coupled to an input of other nodes. An input of an alpha node may exist within an alpha network (described below) and an output of an alpha node may terminate at a beta network (described below). A left input adapter node may exist within a beta network and has a single input and a single output, where the output is coupled to inputs of other nodes in the networks. A beta node has one or two inputs and exists within a beta network. A type of beta node is called a join node. A special type of a beta node is called a from node. A join node has two inputs (a left input and a right input) and performs a join of the inputs. A join node has one output that may be coupled to inputs of other nodes. A from node has a single left input and one output which is coupled to an input of another node. The network including the different nodes may be constructed as a directed acyclic graph that represents a rule set.

In an embodiment, nodes in a network may each have a single output. A single output of a node may propagate to one or more other nodes downstream (nodes that are physically located beneath the node) in the network.

An alpha network is a left side of the network. Nodes in the alpha network may perform comparisons between objects to find matches. If an object is successfully matched against the conditions represented by one node in the alpha network, it is passed to a next node.

A beta node is a one or two input node that exists within a beta network. A beta network is a right side of the network. Nodes included in the beta network may include from nodes and join nodes. Join nodes are two input, one output nodes. A two input node has a left and a right input. From nodes are one input, one output nodes. Each beta node may send an output to a beta memory.

"Alpha" constraints are evaluated by alpha nodes and "beta" constraints are evaluated by the beta nodes. Alpha constraints do not depend upon other objects asserted into a rule engine. Therefore, joins may not be needed for alpha constraints. One example of such a constraint is: Patient (gender=="Female"), where the "gender" attribute of each "Patient" object is compared to the constant string "Female." A Patient object may be evaluated against the above constraint independent of other objects. Beta constraints on the other hand depend upon other objects and may utilize joins.

When a beta node is added to the network, that beta node will have a left input and a right input. A left input adapter node may exist within a beta network has a single input and a single output. The left input may be connected to a left input adapter node, to another beta node, or to a single input from node. A from node may exist within a beta network and has a single left input and one output.

The rule engine 115 includes a pattern matcher 120. The pattern matcher 120 generates a network (such as a Rete network) to evaluate the rules from the rule repository 105 against the data objects from the working memory 110. As objects propagate through the network, the pattern matcher 120 may evaluate the objects against the rules and/or constraints derived from the rules in the rule repository 105.

Fully matched rules and/or constraints may result in activations, which are placed into the agenda 125. The rule engine 115 may iterate through the agenda 125 to execute or fire the activations sequentially. Alternatively, the rule engine 115 may execute or fire the activations in the agenda 125 randomly.

Objects that are represented by an object-oriented model may include references to nested objects. Typical alpha and beta nodes may not be able to access or interpret references to nested objects. Therefore, a new node called a "from" node may be placed in the network in order to propagate objects that are represented by an object-oriented model. When a from node is added to the network (for objects represented by an object-oriented model), the from node has a single left input. A from node receives in its single input, an expression of an object. The expression of the object is evaluated and a pattern matcher 120 iteratively searches for relevant rules in order to find patterns that match the object. The from node outputs the returned results of the iterations (and provides the output to an input of a next node in the network). The term "from" refers to an object's data source being "from" a data source other than the working memory 110. In an embodiment, a from node may be a special type of beta node whose left parent is determined by the preceding object (in a preceding node having an output coupled to an input of the from node), while its (virtual) right parent is the data source itself. The from node embeds "alpha" constraints to be applied to the values returned by the data source as well as the usual "beta" constraints. The right data source of a from node is evaluated, and its results may be joined with results of a node that is laid out in the network as a parent node of the from node (i.e., an output of a parent node is coupled to an input of the from node) whenever a token propagates from the parent node. A token is a unit of storage within the working memory 110. A token may hold a single object in the working memory 110. Therefore, the object may propagate the nodes of a network via a token. The from node may also perform an evaluation of objects that have not yet been directly inserted into the working memory 110. Therefore, the from node may perform pattern matching on a graph of objects without having to insert all the objects (one by one) from the graph into working memory 110. Each item in the iteration that is not blocked by the constraints in the node produces a new token that is propagated to the child node(s) for further processing. The from node can propagate objects that have references such as nested objects.

A rule terminal node is an end or terminal node. A rule terminal node may have a single input but does not have any outputs (as the network terminates at a rule terminal node). A rule terminal node may be added to an end of the network. When a rule terminal node is added, its source may be a left input adapter node or a beta node (including, for example, a join node or a from node). If the source of the rule terminal node is a beta node, propagation of objects may be blocked at the terminal node level because any blocking can be already performed at a preceding beta node.

In a Rete network, reactivity may be provided for objects represented by a relational model. When an object first propagates within the Rete network (and propagates through the various nodes in the network), partial matches are stored between the object and rules. When the object is later updated or changed, the Rete rule engine does not need to reevaluate all the objects that propagated the network. Rather, the Rete rule engine may reevaluate the objects that are changed in the working memory 110. The Rete rule engine then rematches the updated object with the rules to create updated partial matches. Thus, a Rete rule engine may support reactivity of objects represented by a relational mode.

Reactivity for objects represented by an object-oriented model may use a special type of from node called a reactive from node. A from node may traverse references to nested objects associated with an object but may not have any way of tracking objects and nested objects after the objects leave the from node. A reactive from node may allow for reactivity by inserting a callback (or a hook) into the object when the object enters the reactive from node. When the object is updated, the callback is used to propagate the changes to the object as well as other nested objects.

A from node may also provide reactivity for objects represented by object-oriented models, similar to reactivity provided by other nodes for objects represented by relational models. Details regarding reactivity provided by a from node are described herein.

Note that a majority of the computations of the algorithm described above may be performed during the compilation phase of the network. When additional objects are received after the network of nodes is set up at the compilation phase, the objects may be added to the working memory 110. However, objects that are propagated to from nodes may not be added to the working memory. Details regarding received objects and how they are propagated based on whether they are represented by object-oriented models or relational models are described herein.

The rule engine 115 includes a pattern matcher 120 and an agenda 125. The pattern matcher 120 implements a network (such as the networks 200, 400, 500, and 700 shown in FIGS. 2, 4, 5 and 7, respectively) to evaluate the rules from the rule repository 105 against the data objects from the working memory 110. When objects are received by the rule engine 115, the objects may be added to the working memory 110. The pattern matcher 120 takes the objects from working memory 110, and matches properties of the objects against constraints of the nodes in the network. The pattern matcher 120 traverses the network for objects, first matching the properties of the object against object type nodes, and then alpha nodes, beta nodes and/or from nodes that are children of the object type nodes, and then those node's children, and so on. If an object is represented by an object-oriented model and includes references to nested objects, the pattern matcher 120 matches the object to a from node. If the object is represented by a relational model and does not include any references to nested objects, the pattern matcher 120 may match the object to other types of nodes other than from nodes (e.g., join nodes). The path an object propagates from a root node to a rule terminal node defines a complete rule's left hand side (all the constraints associated with the rule). As new objects (commonly referred to as facts) and/or expressions of the new objects are evaluated by pattern matcher 120, these objects propagate along the network. If the objects satisfy the constraints of a node, the pattern matcher annotates that node with an indication that the object satisfies the constraints. When an object or combination of objects causes all the constraints for a given rule to be satisfied, a rule terminal node is reached and the corresponding rule is triggered. When this occurs, the pattern matcher 120 adds the object or combination of objects to the agenda 125 along with an indication of the rule whose conditions were satisfied. All nodes may have memory to store a reference to the objects (or facts or tuples which result after objects propagate through nodes) propagated to them, if any. If a rule fails to be fully matched, then no corresponding activation results.

The agenda 125 provides a list of rules to be executed and objects on which to execute the rules. Execution engine 130 executes operations defined in the right side of rules that are indicated in the agenda 125. Often, such execution of operations causes the properties of one or more objects to be changed. If an object is to be changed, the execution engine 130 modifies 135 the object in working memory 110, and the rule engine 115 will again evaluate the modified object (and its expressions) using the network.

The pattern matcher 120 may also determine whether an object includes a reference to a nested object or not. If an object lacks a reference to a nested object, the pattern matcher 120 determines that the object is represented by a relational model. If an object includes a reference to a nested object, then the pattern matcher 120 determines that the object is represented by an objected-oriented model. Responsive to the pattern matcher 120 determining that the object is represented by the relational model, the pattern matcher 120 matches the object against the constraints of a beta node (e.g., a join node). The join node performs a join between the object and another second object based on a relationship between the object and the second object. The join node includes a left input that receives the object and a right input that receives the second object.

Responsive to the pattern matcher 120 determining that the object is represented by the object-oriented model, the pattern matcher 120 matches the object against the constraints of a from node. The pattern matcher 120 uses the from node to evaluate an expression of the object (i.e., a first object) to navigate to another object (i.e., a third object) that is a nested object of the first object. The expression of the first object may be an expression that represents a relationship between the first object and the second object. The expression may be represented by a dot accessor which may represented a nested object. For example, an expression may be person.address. To evaluate the expression, the from node may navigate to the "address" object which is nested within the "person" object. The from node includes a single input that receives the first object.

The pattern matcher 120 may cycle through or iterate through each node in order to find a match between the object and a node. If a match is not made between a node and an object, the pattern matcher 120 continues onto the next node to find a match, and so on. In an embodiment, there may be more than one match between an object and a node. For example, a class may implement multiple interfaces or extend to multiple class types. Therefore, the object may be matched to more than one node.

The pattern matcher 120 may first propagate the object through alpha nodes and from nodes (which are a part of an alpha network) and then through the left input adapter nodes or beta nodes (which are a part of the beta network).

Figure 2:
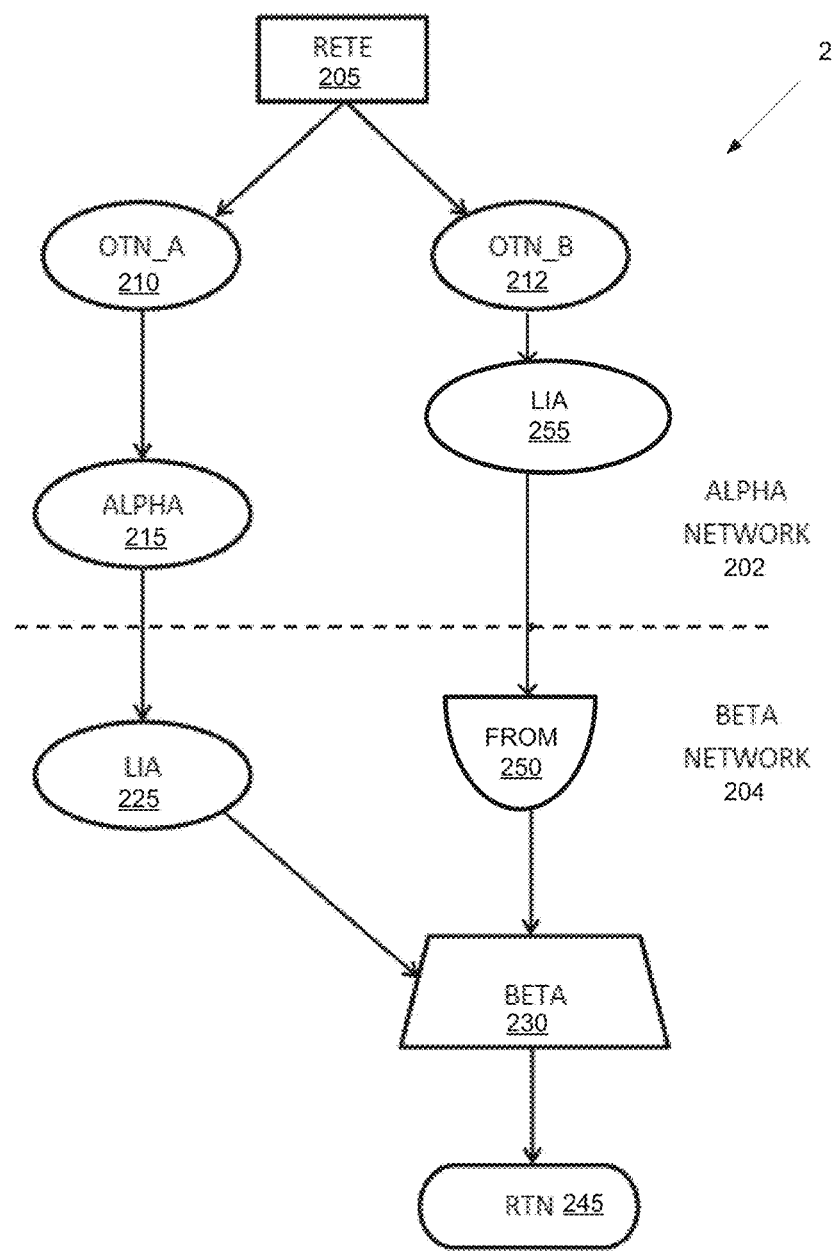
FIG. 2 illustrates a simple example network having a single rule, in accordance with one embodiment of the present invention.

Details regarding the alpha and beta network are described herein with respect to FIG. 2.

The from node may be a non-reactive from node or a reactive from node. When an object (i.e., an object that is represented by an object-oriented model) that has previously propagated the network (and one or more from nodes) changes, the from node may not be able to keep track of changes that may be made to the object after the object leaves the from node. The changes to the object may be made by a user or by an application. In an embodiment, changes to the object may be made even if the from node may not be able to keep track of changes. A from node that may not keep track of objects is a non-reactive from node. A reactive from node may be able to keep track of objects even after the objects have left the reactive from node. The reactive from node may insert a callback (or a hook) into each object that enters the from node. The insertion of the callback enables the reactive from node to be notified by the object when a change to the object is made (for example, a change to the state of the object is made). The notification may be issued from the object to the reactive from node which enables the reactive from node to react to the changes. Thus, the reactive from node may be notified of changes to an object when changes are made to the object, and the reactive from node may use the callback to reevaluate the object in view of the changes to the object as well as any nested objects.

When an object is inserted into the rule engine 115, the object is added to the working memory 110. When the pattern matcher 120 matches the object against the constraints of a reactive from node, the reactive from node will inject a callback (or a hook) into the object when the object is input into the from node. The callback allows for updates made to an object to be implemented within that object and other related objects. The callback may be used to track objects. When a change is made to that object or another object that has a relationship with that object (for example, another object that is a nested object of the particular object changes), the callback may be used by the rule engine to update the object (as well as other related objects) via the pattern matcher. Specifically, the callback may be used by the rule engine to enforce the reevaluation of modified objects by the pattern matcher. Details regarding the callback are described herein.

FIG. 2 illustrates a simple example network 200 having a single rule, in accordance with one embodiment of the present invention. It should be understood that in most instances a network will include multiple rules and have more nodes than those shown in the example provided. Each rule may be represented by a separate rule terminal node.

The network 200 is logically divided into an alpha network 202 and a beta network 204. The alpha network 202 includes a root node (also referred to as a Rete node) 205, object type nodes (e.g., object type node A (OTN_A) 210 and object type node B (OTN_B) 212), alpha nodes (e.g., alpha node 215), and may additionally include other node types. The beta network includes left input adapter (LIA) nodes (e.g., LIA 225 and LIA 255), beta nodes (e.g., beta node 230 and from node 250) and rule terminal nodes (RTN) (e.g., RTN 245), and may additionally include other node types.

Data objects enter the network 200 at the root node 205, from which they are propagated to any matching object type nodes (e.g., object type node A (OTN_A) 210 and/or object type node B (OTN_B) 212). From an object type node (OTN_A 210 or OTN_B 212), a data object may be propagated to an alpha node (if there is a literal constraint) 215, or a from node 250 or beta node 230 if the object is of the proper object type. A data object that is represented by an object-oriented model may be propagated to the from node 250. A data object that is represented by a relational model may be propagated to an alpha node 215 and/or a beta node 230. The from node 250 can navigate to nested objects or other from nodes (not shown). Object type nodes, from nodes, and alpha nodes are one input nodes, and compare a single input object to one or more intra-object constraints of the nodes.

From node 250 is a single input node that has a single left input. A left parent of a from node is determined by the preceding pattern from OTN_B 212, while its (virtual) right parent is the data source itself, which may not be from working memory. The right source of a from node is evaluated, and its results joined, whenever a token propagates from the left parent. Each item in the iteration that is not blocked by the constraints in the node produces a new token that is propagated to the child node(s) for further processing. The from node may propagate objects that have references such as nested objects.

A beta node 230 is a two input node that includes a left input and a right input. Join nodes, not nodes, and exists nodes are some examples of beta nodes. Beta nodes apply inter-object constraints to a pair of objects rather than to a single object. A beta node 230 may receive tuples in its left input and objects in its right input. The beta node 230 may receive tuples for objects from the LIA 225. If a property of the tuple is relevant to the left input of the beta node, then the tuple may be placed into a left input memory of the beta node 230. The beta node 230 may additionally receive objects from OTN_B 212, and may place the objects into a right input memory. If a property of the object is relevant to the right input of the beta node 230, the object may be placed into the right input memory of the beta node 230.

The beta node 230 may then make join attempts between the objects in the right input memory and the tuples in the left input memory. If a join attempt is successful, the object is added to the tuple and then propagated to the left input of the next node until the tuple reaches a rule terminal node (RTN) 245. The tuples stored in the left input memories are partially matched. When a tuple reaches a rule terminal node 245, the tuple is fully matched. For example, if a tuple output by LIA 225 successfully joins with an object from OTN_B 212, then the tuple is propagated to the rule terminal node 245. At the rule terminal node 245, an activation is created from the fully matched tuple and a rule corresponding to the rule terminal node 245. The activation is placed onto an agenda of the rule engine for potential firing or execution.

Figure 3:
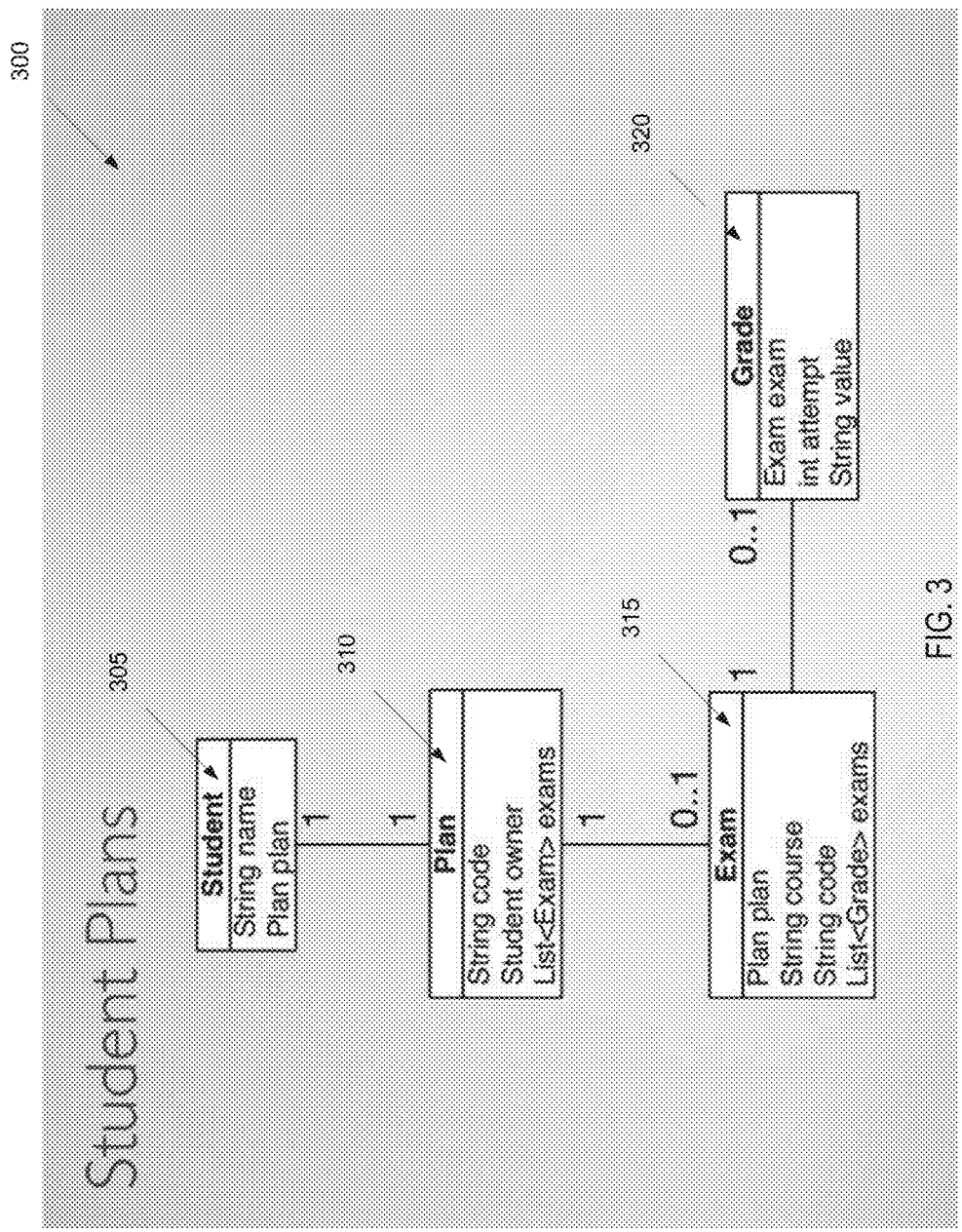
FIG. 3 illustrates an example of object relationships, in accordance with one embodiment of the present invention.

FIG. 3 illustrates an example of object relationships, in accordance with one embodiment of the present invention. In the example, a class 300 called "Student Plans" includes a student object 305, a plan object 310, an exam object 315, and a grade object 320. The class 300 may be created for university students who have enrolled in a plan that has exams which are assigned grades. Student object 305 includes functions "string name" and "plan plan". Plan object 310 includes functions "string code", "student owner", and "list<Exam>exams". Exam object 315 includes functions "plan plan", "string course", "strong code", and "list<Grade>exams". Grade object 320 includes functions "exam exam", "int attempt", and "string value".

Student object 305 has a one-to-one relationship with plan object 310. For example, one student may have one plan. Suppose that a student X majors in mathematics. Student X would have one plan—mathematics. Similarly, another student may have another plan. However, one student may not have more than one plan. Thus, the relationship between the student and the plan is a one-to-one relationship.

Plan object 310 has a one-to-many relationship with exam object 315. That is, each plan (i.e., a student's university major) has multiple associated plans. Exam object 315 has a one-to-many relationship with a grade object 320. An exam may be assigned one or more multiple grades. For example, if an exam is retaken, two grades may be assigned to the exam. Therefore, an exam may have a one-to-many relationship with grades.

When represented by an object-oriented model, a student object may be a nested object plan. The nested object plan may have a further nested object exam. The nested object exam may have a further nested object grades.

Figure 4:
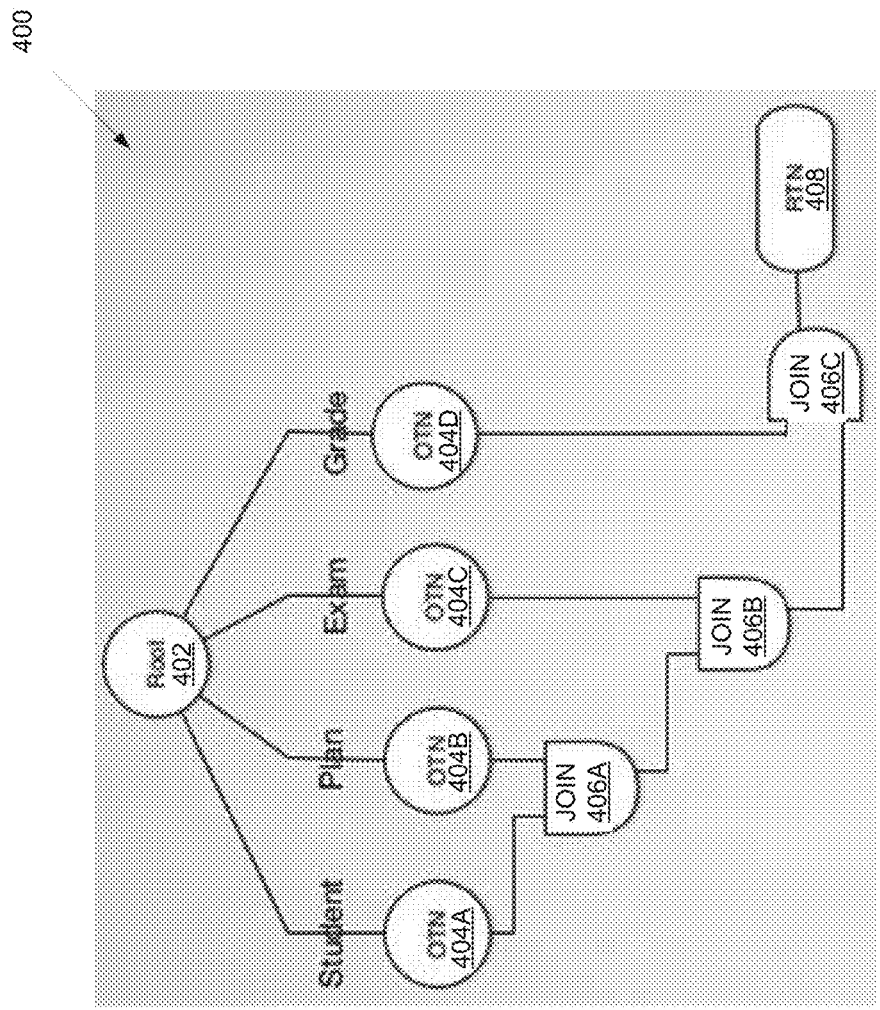
FIG. 4 illustrates another example network having a single rule, in accordance with one embodiment of the present invention.

FIG. 4 illustrates another example network 400 having a single rule, in accordance with one embodiment of the present invention. The network 400 is set up using a relational model. The network 400 includes a root node 402, object type nodes (OTN) (e.g., OTN 404A, OTN 404B, OTN 404C, and OTN 404D), beta nodes (e.g., JOIN node 406A, JOIN node 406B, and JOIN node 406C), and rule terminal nodes (RTN) (e.g., RTN 408), and may additionally include other node types. OTN 404A is for the object student. OTN 404B is for the object plan. OTN 404C is for the object exam. OTN 404D is for the object grade. JOIN node 406A performs a cross-product join between OTN 404A and OTN 404B. JOIN node 406B performs a cross-product join between OTN 404C and the output of JOIN 406A. JOIN node 406C performs a cross-product join between OTN 404D and the output of JOIN 406B. At RTN 408, all cross-products between the OTNs are performed. Therefore, at RTN 408, each student will be matched to an appropriate plan, one or more exams and one or more grades.

Each JOIN node 406 (e.g., any one of JOIN node 406A, JOIN node 406B, and JOIN node 406C) has a left input and a right input. When a JOIN node 406 receives an object propagation to the left input, the object is added to the left input. All of the objects in the right input are iterated through in order to determine a match. If a match is found, the constraints of the JOIN node 406 are applied to the object. The object is then propagated to a next child node with a new tuple. The tuple may also be referred to as a token or partial match. For an object that propagates into the right input, the object also propagates to the left input.

Figure 5:
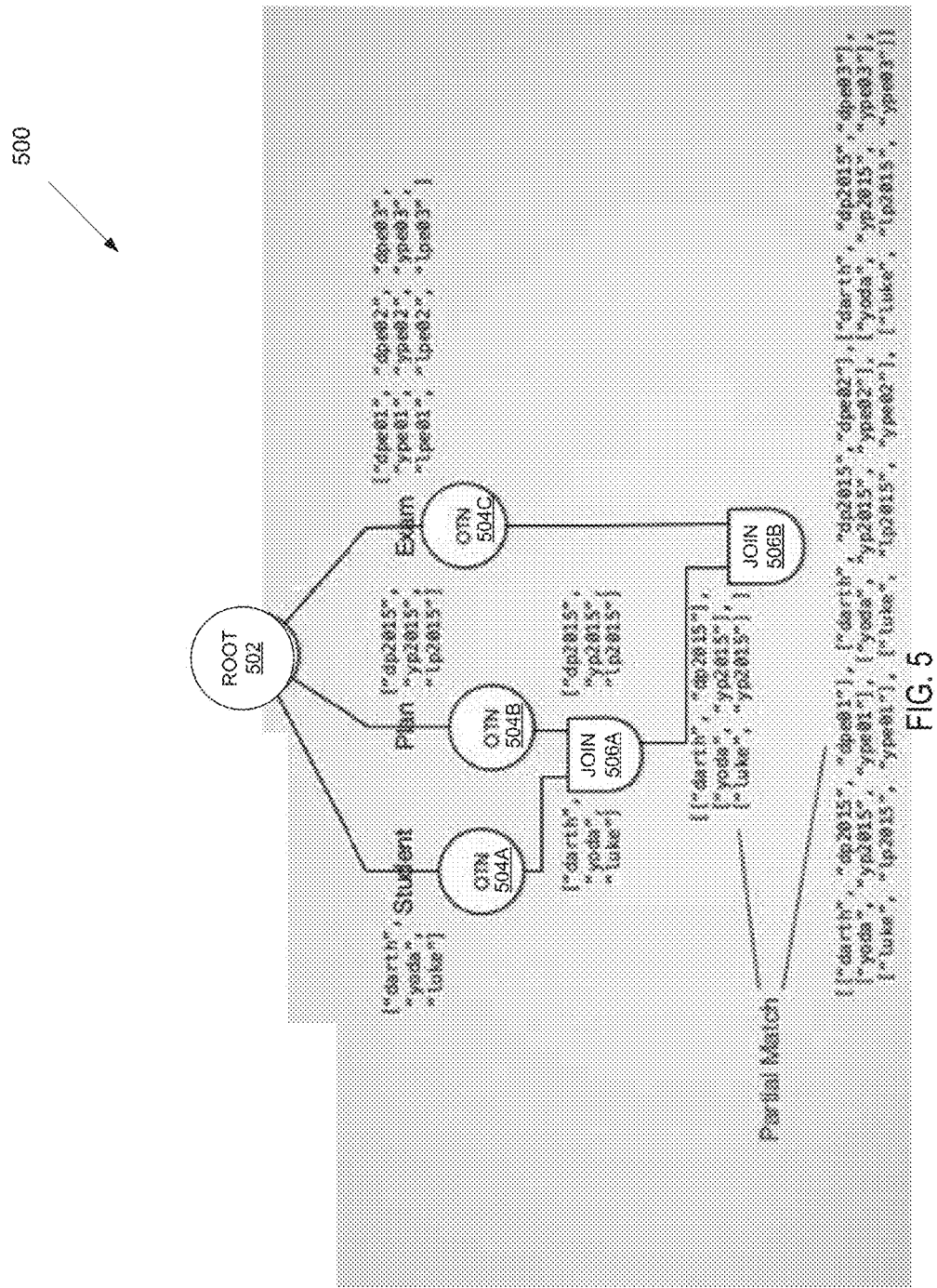
FIG. 5 illustrates another example network having a single rule, in accordance with one embodiment of the present invention.

FIG. 5 illustrates another example network 500 having a single rule, in accordance with one embodiment of the present invention. The network 500 includes a root node 502, object type nodes (OTN) (e.g., OTN 504A, OTN 504B, and OTN 504C), beta nodes (e.g., JOIN node 506A and JOIN node 506B), and may additionally include other node types.

OTN 504A may have students including darth, yoda, and luke. OTN 504B may have a plan including dp2015, yp2015, and lb2015. OTN 504C may be exams including dpe01, dpe02, dpe03, ype01, ype02, ype03, lpe01, lpe02, and lpe03. Each of these students, plans, and exams may be input as an object.

JOIN node 506A performs a cross-product between the objects in OTN 504A and OTN 504B. The left input of the JOIN node 506A inputs darth, yoda, and luke. The right input of the JOIN node 506A inputs dp2015, yp2015, and lp2015. The output of the JOIN node 506A yields the output [darth, dp2015], [yoda, yp2015] and [luke, yp2015]. The output of the cross-product is referred to as a partial match or a tuple.

JOIN node 506B performs a cross-product between the objects in OTN 504C and the output of the JOIN node 506A. The partial matches which are output at JOIN node 506B include [darth, dp2015, dpe01], [darth, dp2015, dpe02], [darth, dp2015, dpe03], [yoda, yp2015, ype01], [yoda, yp2015, ype02], [yoda, yp2015, ype03], [luke, lp2015, ype01], [luke, lp2015, ype02], [luke, lp2015, ype03].

In an embodiment, each time a JOIN node performs a cross-product, a child tuple is output, where a parent is a previous tuple of the JOIN node. For example, darth is a first tuple (parent tuple), which joins with dp2015, which is a child tuple. At JOIN node 506B, a one-to-many join between the output of the JOIN node 506A and the OTN 504C (corresponding to exam) to produce another child tuple.

The embodiment described in FIG. 5 may be created in practice with the following rule:

```
rule R1 when
    $student : Student ( )
    $plan : Plan ( owner == $student . name )
    $exam : Exam( plan == $plan.code , course == "Big Data")
    $grade : Grade ( exam == $exam. code )
then
    // RHS
End
```

In an embodiment, rule R1 may be used by objects represented by a relational model and, rule R1 may not be applied to objects that are represented by an object-oriented model.

In an embodiment, when changes are made to any of the objects (plan, exam, and/or grade), the user who implements the changes notifies the rule engine. The rule engine may not support reactivity. Thus, the rule engine may receive an explicit notification by the user, and responsive to receipt of the notification the rule engine may react to the change. In response to the notification, the expressions of the objects that are affected within rule R1 may be reevaluated by the pattern matcher of the rule engine so that updates to the objects (i.e., any objects affected by the changes) can be made. In an embodiment, objects that are not affected by the changes may not be reevaluated.

In order to instantiate rule R1, all objects are inserted into the rule engine and the rule engine searches the join space for each relationship between all of the objects. If N is a number of objects stored in the working memory and P is a number of patterns that exist between all objects, the rule engine may use an algorithm to perform a number of relational joins on the order of $N^P$. Performing join operations using the join nodes in a network may take a significant amount of time, especially when the values of N and P are high. The rule engine may utilize indexing (when it is supported) in order to improve performance of join operations performed by join nodes. However, indexing requires additional memory occupation. If an object that is represented by an object-oriented model is not flattened and graph representation is retained by the object, it may be possible to directly traverse references associated with the object instead of searching the join space. This provides a marked improvement in performance, and may reduce an amount of time to process an object and an amount of computing resources used in processing the object. In order to support propagation of objects represented by object-oriented model through a network of nodes without requiring flattening of the object, a from node may be used. The from node allows propagation of objects represented by the object-oriented model (i.e., objects that have references to nested objects). Details regarding a network using from nodes is described herein with respect to FIG. 7.

Note that in the provided example, R1 is written in the Drools® rule language. Although R1 is written in the Drools® Rule Language, it should be understood that any rule language may be used. In one example, when rule R1 is executed or fired up, the result of the rule R1 emails all students enrolled in a course called "Big Data" their grades.

Figure 6:
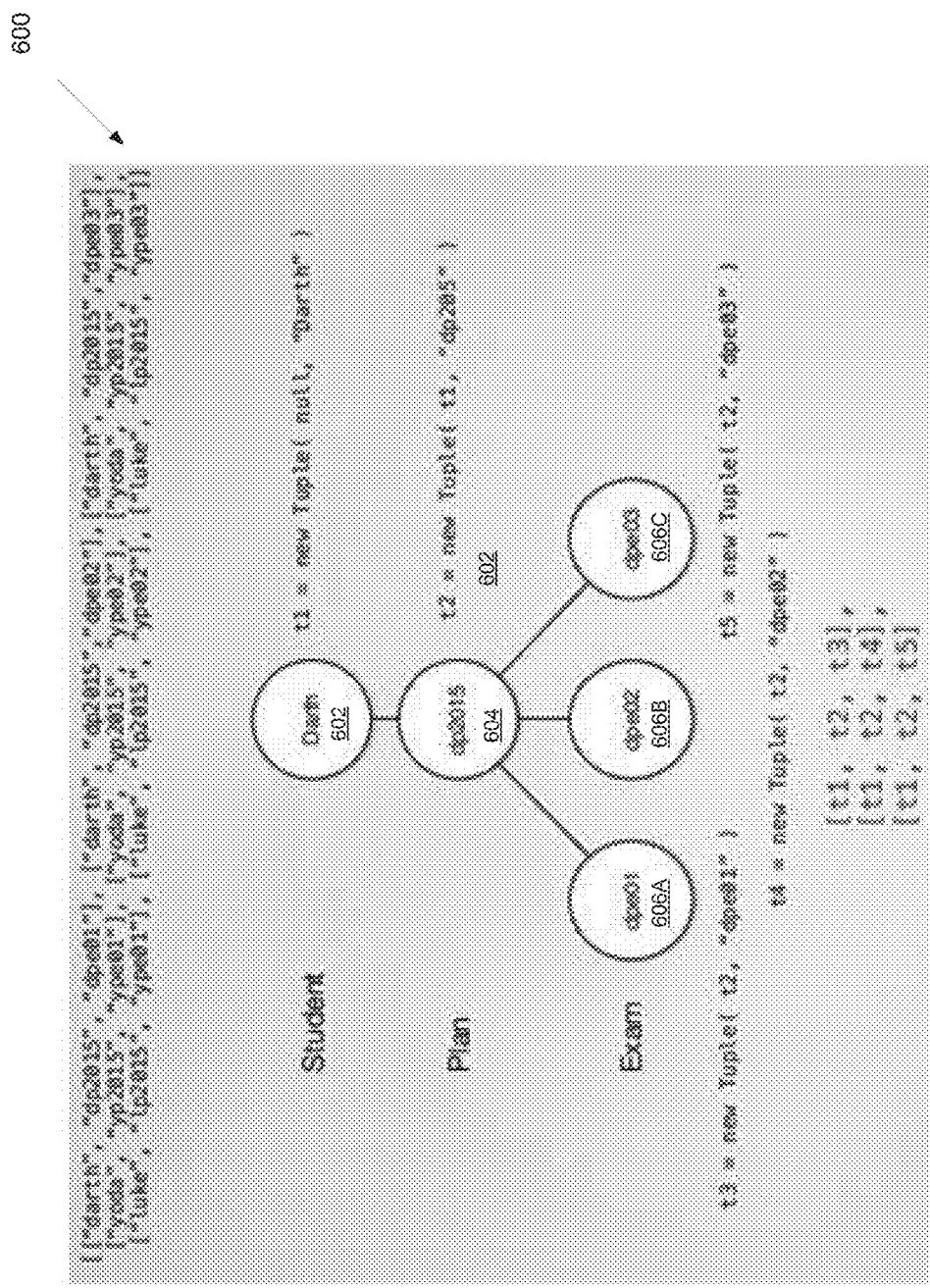
FIG. 6 illustrates an exemplary graph, in accordance with one embodiment of the present invention.

FIG. 6 illustrates an exemplary graph 600, in accordance with one embodiment of the present invention. The graph is produced based on a cross-product depicted in FIG. 5. The graph may be a representation of objects having nested objects. The root of the graph is darth 602 (for the student object), which is also represented as t1. T1 is the root, therefore, t1 does not have a parent (or the parent is null). Darth 602 joins with dp2015 604 (for the plan object), which also represented as t2. T2 has t1 as a parent. Dp2015 604 joins each of dpe01 606A (also represented as t3), dpe02 606B (also represented as t4), and dpe03 606C (also represented as t5). Each of t3, t4, t5 has t2 as a parent. The partial matches are shown as [t1, t2, t3], [t1, t2, t4], and [t1, t2, t5]. A graph may also be provided for grades (not shown).

For objects represented by object-oriented models, where references are made to nested objects, child objects (i.e., nested objects) may be accessed via the references. List comprehension may also be provided so one-to-many relations can be iterated through, similar to objects represented by relational models. Reactive as well as passive operations may also be supported. For objects represented by object-oriented models, a from node in the network may be used, which may access nested objects, as described herein with respect to FIG. 7.

Figure 7:
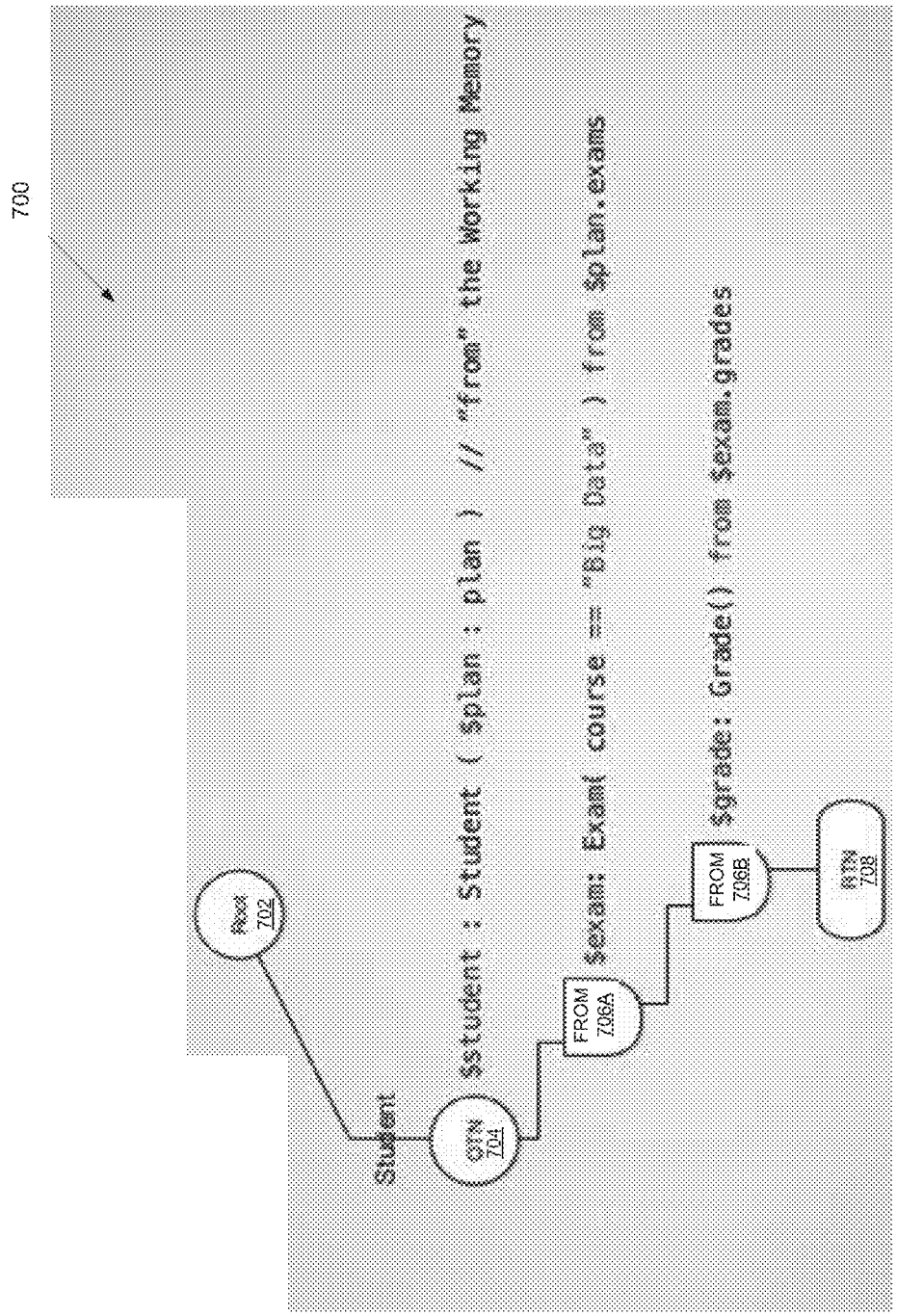
FIG. 7 illustrates another example network having a single rule and implementing nodes for objects represented by an object-oriented model, in accordance with one embodiment of the present invention.

FIG. 7 illustrates another example network 700 having a single rule and implementing nodes for objects represented by an object-oriented model, in accordance with one embodiment of the present invention. The network 700 includes a root node 702, from nodes (e.g., FROM node 706A and FROM node 706B), rule terminal nodes (RTN) (e.g., RTN 708), and may additionally include other node types. Each FROM node 706 (i.e., FROM node 706A and FROM node 706B) has a single left input that receives a parent tuple. The FROM nodes 706 have no right input. Therefore, nothing is inserted into the FROM node 706 from the working memory 110 (with the exception of student). In the FROM node 706, the left input token evaluates an expression and returns an item (a single item or a collection of items) and the tuple will join with the results of that expression. The FROM node 706A inputs the output of OTN 704 (the student from working memory 110). The FROM node 706A evaluates a student expression and returns an exam tuple. At the FROM node 706A, the exam tuple is input (which is the output of the FROM node 706A) and the FROM node 706A evaluates an exam expression and returns a grade tuple. The grade tuple with the partial matches are provided to RTN 708.

The embodiment described in FIG. 7 may be created in practice with the following rule:

```
rule R2 when
    $student : Student ( $plan : plan )
    $exam: Exam( course == "Big Data") from $plan.exams
    $grade : Grade ( ) from $exam.grades
then
    /* RHS */
end
```

In rule R2, the student object is inserted into the working memory, while the plan, exam and grade objects may remain outside of the working memory and may be reached by navigating the references among them. In an embodiment, in rule R2, $student, $exam, and $grade are each referred to as a binding. A binding that is separated from an object using a colon ":" is referred to as an expression. In an embodiment, the combination of bindings ($plan) and use of the expression ($plan.exams) may allow for the elimination of the plan object (or plan pattern). In rule R2, the implementation of the from node is non-reactive. Therefore, the rule engine may not respond to changes that may be made to plan, exam or grade objects even if those objects are updated explicitly. The evaluation of the expression at a from node (via a pattern matcher) is driven by a left input propagation. Rule R2 results in a reduction of pattern matching by using references and may eliminate iterations over objects that are not nested.

When compared to rule R1, rule R2 uses a from construct to traverse the reference between plan and exams and exam and grades, instead of performing a search for exams and grades in the join space.

Although rule R2 is written in the Drools® Rule Language, it should be understood that any rule language may be used for the rules.

Rule R2 may not provide list comprehension. The dot accessor "." in rule R2 returns without performing list comprehension. Rule R2 may be passive, but not reactive. Therefore, rule R2 may not update objects when other objects change. In order to provide a reactive from node, rule R3 may be used.

```
rule R3 when
    Student ( $grade : /plan/exams {course == "Big Data"}/grades )
then
            /*RHS ... */
end
```

Rule R3 uses the forward slash "/" as a reference accessor to access a reference to a nested object. The forward slash "/" may also perform list comprehension for each accessed reference and if an individual item is returned as a result of the reference accessor, that one item will be visited.

Rule R3 may allow objects represented by a relational model or an object-oriented model to be used together within one rule.

In the embodiment depicted in FIG. 7, after an object is received at a terminal node (such as RTN 708), the object is propagated to an output of the terminal node. A rule associated with the object (such as rule R3) is stored within rule repository 105. The rule is then scheduled for execution and may enter a queue of rules that are awaiting execution/firing up. The queue of rules may be sorted based on a priority. For example, rules that have a higher priority may be placed on top of the queue and rules with lower priority may be placed on the bottom of the queue. The rules may be sorted by other means including first-in-first-out (FIFO), last-in-first-out (LIFO), or another order. When a rule is ready for execution, the rule is fired up by the rule engine 115.

In an embodiment, rule R3 may introduce XPath inspired syntax. XPath inspired syntax may be referred to as OOPath syntax. OOPath syntax may use one or more of the following five guidelines:

1. When OOPath is used on the inside of patterns it should have a syntax that allows the parser to differentiate it from other constraints within the pattern.
2. When OOPath is used on the outside of patterns, it should use a syntax that allows the parser to differentiate it from other rule constructs.
3. OOPath should support both the iteration and the direct access to the collection property, when dealing with multiple cardinality relationships. A collection property may added to an object.
4. OOPath should support inline constraints, allowing objects to be filtered in the traversed collections.
5. OOPath should support named back referencing, in addition to an XPath-like relative back referencing.

A collection property in guideline 3 refers to other objects that are within a collection of an object, where the other objects are a property of the object. An object may have a one-to-many relationship with other objects in an object-oriented model. The object may have a collection of other objects as a property. For example, an object plan may have a collection of exams as a property and each exam may have a collection of grades.

Guidelines 1 and 4 may be satisfied by following XPath conventions. An OOPath expression may start with a "/" and uses curly brackets (e.g., { }) (instead of the square ones used by XPath) to add constraints at any step (also referred to as a segment) of the dereferencing chain of a rule (e.g., rule R3). Conversely, in OOPath notation square brackets (e.g. [ ]) are used to refer to the position of a specific item. Guideline 2 may use a ";" delimiter at the end. Rule R3 may have a variable name in the first segment, which may act as a root of the rule. Guideline 3 uses an additional symbol, a dot (e.g., ".") that may perform dereferencing instead of iteration. Guideline 5 may borrow from existing Drools® syntax for binding of fields, where the field name is prefixed with a variable followed by a colon (i.e., "var :"). That variable may be used in any constraints that come after, either in the same OOPath statement or in other rule constructs below the rule that the variable is used within. Shallow unification of variables may also be supported by combining the colon with an equals ":=". Constraints may be back referenced through these variables, or use a double-dot and slash notation for relative back reference "../../". The relative back referencing may work within the same OOPath statement, whereas named variables may work across other OOPath statements, as well as other standard rule constructs.

The following provides a summary of the guidelines for OOPath syntax, in one embodiment:
1. The rule begins with a "/".
2. The rule may dereference a property of an object with the : operator.
3. The rule may dereference a property of an object using the = operator. If a collection is returned as a result of the = operator, the rule engine will iterate over the values in the collection (as opposed to an individual object).
4. While traversing referenced objects the rule may filter away those objects not satisfying one or more constraints, expressed as predicate expressions between square brackets.
5. Items may also be accessed by their index.

The following pseudocode provides an exemplary OOPath expression that may be defined in Extended Backus—Naur Form (EBNF) notation.

OOPExpr="/" OOPSegment{("/"|".") OOPSegment};

OOPSegment=[ID (":"|":=")]ID["["Number"]"]
["{"Constraints"}"];

The constraints in the above pseudocode may follow normal sub-grammar of the rule language used. Using this pseudocode, rule R2 may be written into rule R3.

Compilation of the above OOPath expression may use a from node for each OOPath segment. In an embodiment, the networks used by rule R2 and rule R3 may be the same.

As described above, by using from nodes, the rule engine can propagate objects represented by the object-oriented model. Therefore, the rule engine can accommodate any type of object (i.e., objects represented by either a relational model or an object-oriented model). An object represented by an object-oriented model may be referred to as a deep fact. An object represented by a relational model may be referred to as a shallow fact. A deep fact is an object that is accessed through references which is different than a shallow fact which is an object accessed through the working memory.

In embodiments, a rule language such as Drools® may support polymorphic object types and use inline matching and cast construct using the "#" operator. Suppose that rule R3 was to be modified to accept certain types of exams and not others. For example, only exams that are instances of a class called PracticalExam having a lab property called "hazard safe" are to be accepted, and no others are to be accepted. The following pseudocode depicts filtering the exams. The lab property "hazard safe" may be available within the class PracticalExam (and may be a nested object within the class PracticalExam) but not in the superclass exam. The following pseudocode, which filters items of a given type, may allow the rule language and the OOPath expression to be both polymorphic and type safe.

Student ($grade:/plan/
  exams{this#PracticalExam.lab=="hazard safe",
  course=="Material Combustion"}/grades)

OOPath syntax may allow access by index, inline cast for type safety, indexed back reference, variable back reference, back tracking and out of pattern use. Examples of OOPath syntax are provided herein:

Access by index

Student ($grade:/plan/exams[0]} course=="Big
  Data"}/grades)

Inline cast for type safety

Student ($grade:/plan/exams{#PracticalExam,
  lab=="hazard safe", course=="Material Combustion"}/grades)

Indexed back reference

A ($var:/b/c/d{f1==../../f2}e)//the ../../ back reference
  to the 'b' field access Variable back reference A ($var:/$b:b/c/d{f1==$b.f2}/e)// the $b is inline
  bound for later use Back tracking A ($var:/$b:b/c/d{f1==$b.f2}/$b/f2)// $var is bound
  to results of the f2 access Out of pattern use $student:Student( )

$grade:/$student/plan/exams{course=="Big Data"}/
  grades;

Advanced OOPath may also be used. Advanced OOPath usage includes transitive closure, negation over transitive closer, accumulation, structural control, and combined graph and relational usage. Examples of advanced OOPath syntax are provided herein.

When OOPath expressions are compiled at the compilation phase, appropriate nodes (including from, alpha, beta, root, terminal, and/or other nodes) are laid out in a network of nodes. The nodes propagate tokens. In traditional rule engines, objects represented by object-oriented models may not have been able to utilize the following pseudocode as traditional rule engines could not propagate such objects through the network. Some relational rule languages may utilize the following pseudocode for object represented by relational models and now, objects represented by object-oriented models may also utilize the pseudocode. Bindings within an OOPath expression may be treated as variables by the rule engine and the bindings may be used in queries. Rules that have objects represented by object-oriented models may also use unification, recursive and transitive closures. Arguments within the OOPath expression may be named or positional arguments. Positional arguments are listed first before named arguments. Positional arguments may be unified and represented by ":=" whereas named arguments may be bound and represented by ":".

A negation over transitive closer rule in a rule language may create a sub-network of nodes when it is fired up or executed. The sub-network of nodes is used to check objects for negation. When a token is split by a node within the sub-network of nodes, one side of the token is input into the sub-network while the other side is input into a negation node (also called a not node). The sub-network feeds the other side of the token into a right input of the negation node. If the negation node finds a match to a left input token, then the token is blocked (as the token already exists). If, however, no match is found, the right input token propagates the node.

Another type of beta node is an accumulate node. Accumulate nodes provide aggregation functions over data flowing through sub-networks. Accumulate nodes may use various types of functions, as all as the functions are wrapped by a class implementing an appropriate rule engine interface. Internally, an accumulation node may work substantially similar to a not node. Accumulate nodes may be fully incremental and support both removal and update of data.

The following pseudocode provides an example of a transitive closure. An object called "Things" may be represented by an object-oriented model. Each Thing may have zero or more child Things (i.e., nested objects) that may be accessed by the children property. The following pseudocode representing a transitive closure example may recursively iterate a graph (representing hierarchical relationships between objects) to check if $x is contained in $y. $z may be unbound and may unify to produce all the children of $y, which may drive the recursion. In an embodiment, the rule engine may not have yet implemented cyclic recursion detection and control, so cyclic recursion may be guarded against within logic of a query or avoided in the data that the query reasons over. The operator ";" may be used to separate the positional and named (i.e., slotted) arguments/parts of a pattern. The positional arguments are located left of the ";" operator.

```
query isContainedIn ( Thing $x , Thing $y )
    /$y/$x := children ;
    or
    /$y/$z := c h i l d r e n; and isContainedIn ($x , $z ; ) )
end
```

The query in the above pseudocode may be used inside other rule constructs. The following pseudocode provides another query that may negate the results of a nested query (also called negation over transitive closer). The query checks if a Thing is not recursively contained in any other Thing.

```
query isNotContainedIn ( Thing $x , Thing $y )
    not ( isContainedIn ( $x , $y ; ) )
end
```

An accumulation rule construct may be used to count the number of Things recursively contained inside a Thing. Pseudocode of an exemplary accumulation is provided herein below. In the following example, $x is unbound and will recursively unify and return all children which are applied to the count function.

```
query count Items ( Thing $y )
    acc ( isContainedIn ( $x , $y ; ) ;
    count ( $x ) ; )
end
```

The following pseudocode provides an example of structural control. In structural control, structural constraints may be asserted by using index access on Lists. The following pseudocode checks that the children are size ordered, where size is the number of children out edges.

```
query childrenOrderedByEdgeCount ( Parent $x , Child $c0 , int index )
    /$x/$c1 : children [ index ] {children. size <= $c0.children.
    size} ;
    childrenOrderedByEdgeCount ( $x , $c1 , index + 1 ; )
end
```

In an embodiment, a rule engine may support reactive and non-reactive queries. Reactive queries may be updated when a change occurs and are dynamic. Non-reactive queries are static and not updated. If a query invocation is prefixed with a "?" operator, then it may be evaluated one time and is not left open for reactivity. Non-reactive queries may internally use fewer references and less memory than reactive queries.

The following pseudocode is a query that combines graph and relational searches. In this query, for a given Thing, all the children of the Thing are recursively visited/accessed. For each child, the query will unify the child and then relationally search the working memory to see if other Things have the same number of children. Any Thing that is to be relationally searched against is to be inserted into the working memory.

```
query findChildrenWithMatchingEdgeCounts ( Parent $x , Child $c , int index )
    /$x/$c := children [ index ] ;
    // relational search
    exists ( Thing ( children.size == $c . children.size) )
    findChildrenWithMatchingEdgeCounts ( $x , $c1 , index + 1 ; )
end
```

As described above, rule R1, which may be used for objects represented by relational models, may be reevaluated when changes to an object occur. However, rule R2, which may be used for objects represented by object-oriented, may not be reevaluated when changes to objects occur. In order to allow for updates to be propagated to objects and nested objects when a change to an object occurs, reactive OOPath statements may be used. Reactive OOPath statements may keep track of any object that is accessed by the rule engine during evaluation of the OOPath. By keeping track of objects that are accessed, the rule engine can react to changes to the objects and take action (i.e., update objects and nested objects) even when the objects are not inserted into working memory.

When a rule engine evaluates an OOPath expression (e.g., $grade:/plan/exams{course= ="Big Data"}/grades) in a rule R3, tokens may propagate into the left input (i.e., the single input) of a from node for each segment (i.e., each portion such as $grade:,/plan, etc.) in the OOPath expression. Each expression may be evaluated for each left input token and the from node outputs an object (or a collection of objects). The left input token may be injected into a parent object (or a collection of objects). For a single object, the from node creates a single child token. For a collection of objects, the from node creates one child token per object. A child token includes a reference to its parent object. The from node applies constraint filters to the object and can propagate the child token if a match is made between the object and the child token. The from node may alternatively apply a filter to each object in the collection of objects and propagate matching children token. When an update to an object or a collection of objects is received by the rule engine, the rule engine may notify the from node to reevaluate the affected OOPath segment. The from node may use the callback injected into the object(s) by the from node to refer to the objects that may require updating.

Rules that use reactive OOPath statements have objects injected with respective callbacks. For example, student, plan, exam, and grade objects may be represented by an object-oriented model and contain references to nested objects (e.g., plan is a nested object of student). When an object is updated, the callback is used to update the object as well as other related objects (such as nested objects, for example). Suppose that new students enroll in the "Big Data" course. When the new students enroll, the student object is updated to append the new students. The plan, grade and exam objects, which are nested and sub-nested objects of the student object, have to be updated. When these objects (student, plan, grade, and exam) previously entered a from node (as shown in FIG. 7), the from node injected respective callbacks into each of these objects. Upon receiving an update to the student object to append additional students, the rule engine can use the respective callbacks in order to update the student, plan, grade, and exam objects. In an embodiment, objects that are affected by a change are to be updated and objects unaffected by the change remain the same. Objects represented by object-oriented models have hierarchical relations with other objects. Therefore, when an object is changed, other objects that are nested (or are hierarchically lower than the changed object) are also changed but objects that are not nested (such as parent objects) may not be changed. By changing the objects that require updating, the rule engine uses a state saving technique to save time, cost, etc. when performing the update. For example, when a professor issues grades to a midterm examination, only the exam object (and perhaps grade object) require updating. The student and plan objects may not require updating. Therefore, upon receiving grades, the rule engine uses the callback of the exam object and nested object grade to update these objects. The student and plan objects which are not nested objects of the exam object may not be updated.

Upon receiving an update to an object, the rule engine may call a function called notifyModification which uses the callback of the object and the callbacks of any nested objects to update the respective objects. The rule engine reevaluates a rule after the update to the object is received. At a reactive from node, the rule engine iterates through its left input (or left tuple which is a token that references back to the reactive from node).

Suppose that the exam object is to be moved to a different course (other than the "Big Data" course). As the exam object is updated, the rule associated with the exam object (e.g., rule R3) should be reevaluated and the grade object nested within the exam object should be recomputed/updated by the from node. The following pseudocode uses the function "notifyModification" for the new course. The following pseudocode may be referred to as an instrumented setter.

```
public void setCourse (String course) {
    this.course = course;
    notifyModification (this);
}
```

The function notifyModification updates classes in a user domain to support the token injections and notification handling of the updated object. The classes may be extended to provide an abstract class called AbstractReactiveOjbect. The class may encapsulate logic to support reactivity of an object, regardless of whether an object is inside or outside of the working memory. Setters that change a state of an object may trigger AbstractReactiveObject. Upon receiving a change, the rule engine will iterate through the objects having injected tokens and find the object that is to be updated. The rule engine then notifies the appropriate from node of the change and the from node changes the object and nested objects.

The following pseudocode depicts an addition of an object:

```
public void add ( Object obj) {
    // add the object to this data structure
    notifyModification (obj) ;
}
```

In an embodiment, when an OOPath statement is no longer selected (or may be removed or deleted), the rule engine instructs the from node to remove injected callbacks within the objects of that OOPath statement. By removing the callbacks, memory leaks may be prevented.

Pseudocode of the from node is shown as follows:

```
public class FromNode extends node {
    public LeftMemory          leftMemory;
    private CompiledExpression exp;
    private int                index;
    public void propagateLeftInsert(Tuple tuple){
        leftMemory.addTuple(tuple);
        Object result = expr.equals( tuple.get(index));
        if (result instanceof Collection) {
            for (Object 0: ((Collection)result)){
                propagateLeftIfAllowed(tuple, o);
            }
        } else {
            propagateLeftIfAllowed(tuple, result);
        }
    }
    private void propagateLeftIfAllowed (Tuple tuple, Object o) {
        if (isAllowed (tuple, o) ) }
            childNode.propagateLeftInsert(new Tuple (tuple, o));
        }
    }
    }
    Public void propagateRightInsert (Object object) {
    //From has no right propagation
    }
}
```

FIG. 8A illustrates one embodiment of a method 800 to determine whether an object is represented by a relational model or an object-oriented model. The method may be performed by processing logic that may comprise hardware (e.g., circuitry, dedicated logic, programmable logic, microcode, etc.), software (such as instructions run on a processing device), firmware, or a combination thereof. For example, computing device 900 in FIG. 9 may perform at least part of the method in some embodiments.

Referring to FIG. 8A, at block 810 processing logic receives a first object. The first object may be stored in working memory.

At decision block 820, processing logic determines whether the first object is represented by a relational model or an object-oriented model. The first object is determined to be represented by the relational model responsive to the first object lacking a reference to a nested object. The first object is determined to be represented by the object-oriented model responsive to the first object including a reference to a nested object. In order to determine whether the first object is represented by a relational model or an object-oriented model, processing logic may analyze the data structure of the first object to determine whether the first object includes (or lacks) a reference to a nested object.

Responsive to processing logic determining that the first object lacks a reference to a nested object, the first object is determined to be represented by a relational model. The method 800 then continues to block 830. At block 830, responsive to determining that the first object is represented by the relational model, processing logic performs a join between the first object and a second object based on a relationship between the first object and the second object using a first node. The first node includes a left input that receives the first object and a right input that receives the second object.

Referring back to decision block 820, responsive to processing logic determining that the first object includes a reference to a nested object, the first object is determined to be represented by an object-oriented model. The method 800 then continues to block 840. At block 840, responsive to determining that the first object is represented by the object-oriented model, processing logic evaluates an expression of the first object to navigate to a third object that is a first nested object of the first object using a second node. In an embodiment, a pattern matcher evaluates the expression of the first object. The second node includes a single input that receives the first object. The process then ends.

In an embodiment, the rule engine generates a network that includes multiple nodes during a compilation phase. The rule engine generates the first node which includes a left input and a right input. The first node may be a type of beta node, such as a join node. The first node may be used by objects represented by relational models. The rule engine may also generate the second node that includes a single input. The second node may be a from node. The from node may be a reactive or non-reactive from node. The from node may be used by objects represented by object-oriented models, where the objects includes references to other nested objects. After the network of nodes is constructed, data structures for each of the first node and the second node are generated by the rule engine. At runtime, objects are placed within the network and propagate the network. Objects that are represented by relational models may propagate appropriate alpha and beta nodes. Objects that are represented by object-oriented models may propagate appropriate from, alpha and beta nodes. Therefore, the rule engine can create networks that can be used by both objects represented by relational models as well as objects represented by object-oriented models.

When the first object described in FIG. 8 is received by a terminal node (after it propagates through from, alpha, and/or beta nodes), the terminal node propagates the first object to an output of the terminal node. The rule engine then determines a rule associated with the first object and may schedule execution of the rule. The rule may be scheduled for execution based on a queue.

Figure 8B:
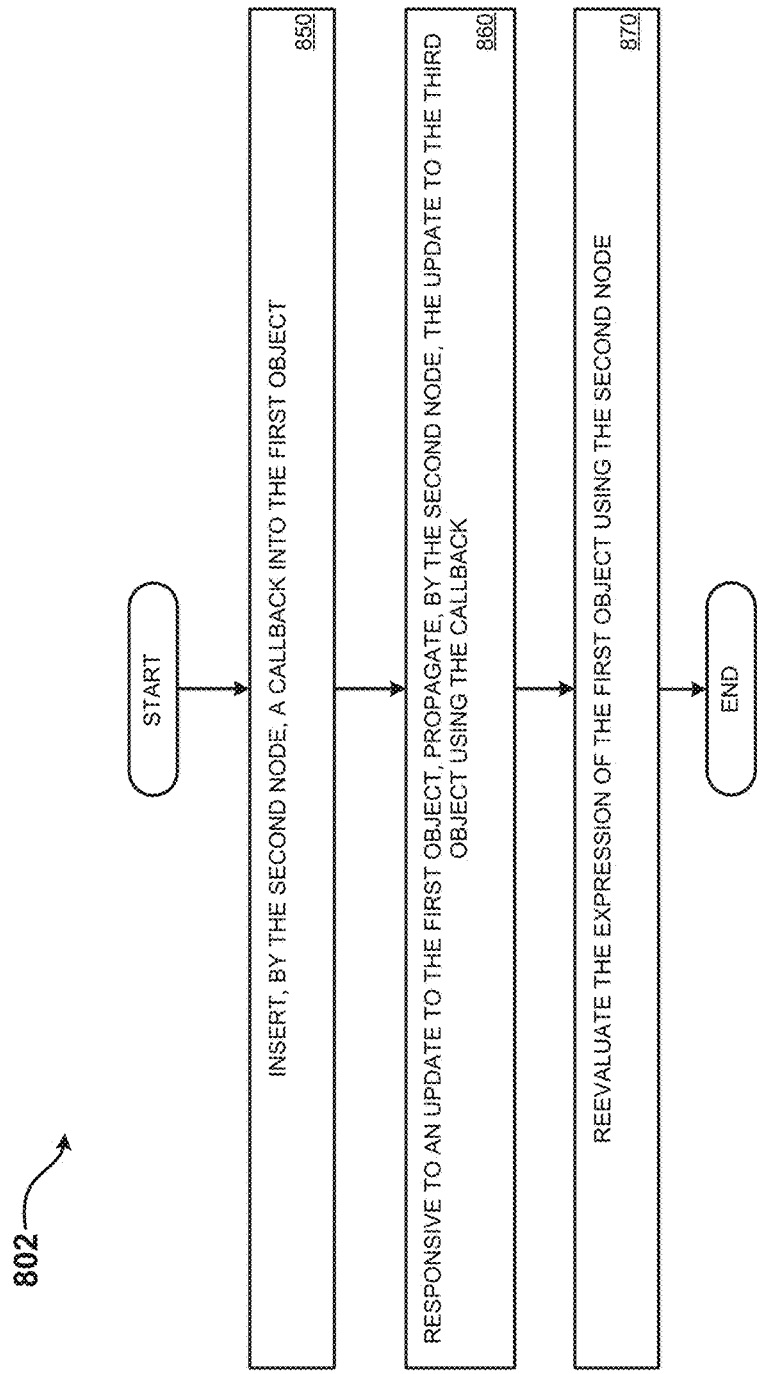
FIG. 8B illustrates an embodiment of a method using a callback to update an object in response to a change.

FIG. 8B illustrates an embodiment of a method 802 using a callback to update an object in response to a change. The method may be performed by processing logic that may comprise hardware (e.g., circuitry, dedicated logic, programmable logic, microcode, etc.), software (such as instructions run on a processing device), firmware, or a combination thereof. For example, computing device 900 in FIG. 9 may perform at least part of the method in some embodiments.

In one embodiment, the method 802 starts after block 840 in FIG. 8A. Therefore, the first object is determined to be represented by an object-oriented model as the first object includes a reference to a nested object.

Referring to FIG. 8B, at block 850 processing logic inserts, by the second node, a callback into the first object. In an embodiment, processing logic may insert or inject a callback into the third object which is a nested objected of the first object, as well as other nested objects. Specifically, at a from node, a callback is injected into a nested object when the first object enters the from node. At block 860, responsive to an update to the first object, processing logic propagates, by the second node, the update to the third object using the callback. At block 870, processing logic reevaluates the expression of the first object using the second node. In an embodiment, the pattern matcher reevaluates the expression of the first object. The process then ends.

The injection of the callback into the objects allows a from node to track the object (as well as nested objects) after the object leaves the from node. When the rule engine receives an update to the object, the rule engine alerts the from node to call back the object(s) affected by the update. The objects (and nested objects) may then be reevaluated by the from node in view of any changes to the objects/nested objects. Any objects that are not affected by the changes may not be called back by the from node and may not be reevaluated.

Figure 9:
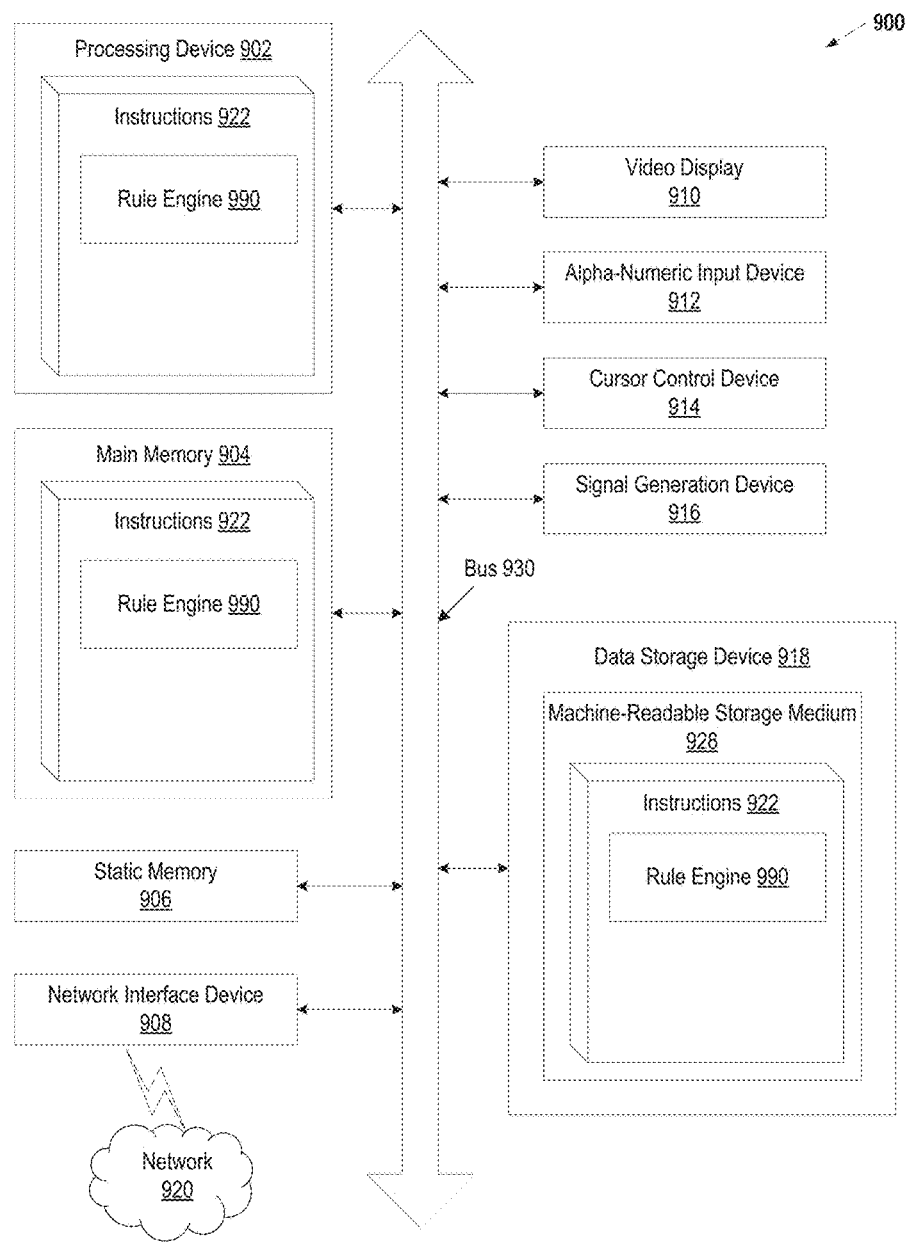
FIG. 9 illustrates a block diagram of an exemplary computing device.

FIG. 9 illustrates a diagrammatic representation of a machine in the exemplary form of a computing device 900 within which a set of instructions for causing the machine to perform any one or more of the methodologies discussed herein, may be executed. In alternative embodiments, the machine may be connected (e.g., networked) to other machines in a LAN, an intranet, an extranet, and/or the Internet. The machine may operate in the capacity of a server or a client machine in client-server network environment, or as a peer machine in a peer-to-peer (or distributed) network environment. The machine may be a personal computer (PC), a laptop PC, a set-top box (STB), a Personal Digital Assistant (PDA), a cellular telephone, a tablet computer, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The exemplary computing device 900 includes a processing device 902, a main memory 904 (e.g., read-only memory (ROM), flash memory, dynamic random access memory (DRAM) such as synchronous DRAM (SDRAM) or Rambus DRAM (RDRAM), etc.), a static memory 906 (e.g., flash memory, static random access memory (SRAM), etc.), and a data storage device 918, which communicate with each other via a bus 930.

Processing device 902 may represent one or more general-purpose processors such as a microprocessor, a central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 902 may also be one or more special-purpose processing devices such as an application specific integrated circuit (ASIC), a field programmable gate array (FPGA), a digital signal processor (DSP), network processor, or the like. The processing device 902 is configured to execute processing logic (e.g., instructions 922) for performing the operations and steps discussed herein.

The computing device 900 may further include a network interface device 908. The computing device 900 also may include a video display unit 910 (e.g., a liquid crystal display (LCD) or a cathode ray tube (CRT)), an alphanumeric input device 912 (e.g., a keyboard), a cursor control device 914 (e.g., a mouse), and a signal generation device 916 (e.g., a speaker).

The data storage device 918 may include a machine-readable storage medium 928 on which is stored one or more sets of instructions 922 embodying any one or more of the methodologies or functions described herein. The instructions 922 may also reside, completely or at least partially, within the main memory 904 and/or within the processing device 902 during execution thereof by the computing device 900, the main memory 904 and the processing device 902 also constituting machine-accessible storage media. In one embodiment, instructions 922 include instructions for a rule engine 990 that includes a pattern matcher and object detector and that performs operations described herein above.

While the machine-readable storage medium 928 is shown in an exemplary embodiment to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing a set of instructions for execution by the machine and that cause the machine to perform any one or more of the methodologies of the present invention. The term "machine-readable storage medium" shall accordingly be taken to include, but not be limited to, solid-state memories, optical and magnetic media.

It is to be understood that the above description is intended to be illustrative, and not restrictive. Many other embodiments will be apparent to those of skill in the art upon reading and understanding the above description. The scope of embodiments should, therefore, be determined with reference to the appended claims, along with the full scope of equivalents to which such claims are entitled.

What is claimed is:

1. A method comprising:
    receiving a first object by a processing device executing a rule engine;
    determining, by the processing device, whether the first object is represented by a relational model or an object-oriented model, wherein the first object is determined to be represented by the relational model responsive to the first object lacking a reference to a nested object, and wherein the first object is determined to be represented by the object-oriented model responsive to the first object comprising a reference to a nested object;
    responsive to determining that the first object is represented by the relational model, performing a join between the first object and a second object based on a relationship between the first object and the second object using a first node, wherein the first node comprises a left input that receives the first object and a right input that receives the second object; and
    responsive to determining that the first object is represented by the object-oriented model, evaluating an expression of the first object to navigate to a third object that is a first nested object of the first object using a second node, wherein the second node comprises a single input that receives the first object.

2. The method of claim 1, further comprising:
    inserting, by the second node, a callback into the third object.

3. The method of claim 2, further comprising:
    responsive to an update to the first object, propagating, by the second node, the update to the third object using the callback; and
    reevaluating the expression of the first object using the second node.

4. The method of claim 3, further comprising notifying one or more children nodes associated with the second node of the update.

5. The method of claim 1, wherein the first object represented by the object-oriented model comprises a hierarchical data structure.

6. The method of claim 1, wherein the rule engine comprises a Rete rule engine.

7. The method of claim 1, further comprising:
    generating a network comprising a plurality of nodes by:
        generating the first node comprising the left input and the right input; and
        generating the second node comprises the single input; and
        generating respective data structures for each of the first node and the second node.

8. The method of claim 1, further comprising:
    receiving the first object at a terminal node;
    propagating the first object to an output of the terminal node using the terminal node;
    determining a rule associated with the first object; and
    scheduling execution of the rule.

9. A system comprising:
    a memory; and
    a processing device, operatively coupled to the memory, to:
        receive a first object by a processing device executing a rule engine;
        determine whether the first object is represented by a relational model or an object-oriented model, wherein the first object is determined to be represented by the relational model responsive to the first object lacking a reference to a nested object, and wherein the first object is determined to be represented by the object-oriented model responsive to the first object comprising a reference to a nested object;
        responsive to determining that the first object is represented by the relational model, perform a join between the first object and a second object based on a relationship between the first object and the second object using a first node, wherein the first node comprises a left input that receives the first object and a right input that receives the second object; and
        responsive to determining that the first object is represented by the object-oriented model, evaluate an expression of the first object to navigate to a third object that is a first nested object of the first object using a second node, wherein the second node comprises a single input that receives the first object.

10. The system of claim 9, wherein the processing device is further to:
insert, by the second node, a callback into the third object.

11. The system of claim 10, wherein the processing device is further to:
responsive to an update to the first object, propagate, by the second node, the update to the third object using the callback; and
reevaluate the expression of the first object using the second node.

12. The system of claim 11, wherein the processing device is further to notify one or more children nodes associated with the second node of the update.

13. The system of claim 9, wherein the first object represented by the object-oriented model comprises a hierarchical data structure.

14. The system of claim 9, wherein the rule engine comprises a Rete rule engine.

15. The system of claim 9, wherein the processing device is further to:
generate a network comprising a plurality of nodes, wherein to generate the network the processing device is further to:
generate the first node comprising the left input and the right input; and
generate the second node comprises the single input; and
generate respective data structures for each of the first node and the second node.

16. A non-transitory computer readable storage medium comprising instructions that, when executed by a processing device, cause the processing device to:
receive, by the processing device, a first object by a processing device executing a rule engine;
determine, by the processing device, whether the first object is represented by a relational model or an object-oriented model, wherein the first object is determined to be represented by the relational model responsive to the first object lacking a reference to a nested object, and wherein the first object is determined to be represented by the object-oriented model responsive to the first object comprising a reference to a nested object;
responsive to determining that the first object is represented by the relational model, perform, by the processing device, a join between the first object and a second object based on a relationship between the first object and the second object using a first node, wherein the first node comprises a left input that receives the first object and a right input that receives the second object; and
responsive to determining that the first object is represented by the object-oriented model, evaluate, by the processing device, an expression of the first object to navigate to a third object that is a first nested object of the first object using a second node, wherein the second node comprises a single input that receives the first object.

17. The non-transitory computer readable storage medium of claim 16, including further instructions that, when executed by the processing device, cause the processing device to:
insert, by the second node, a callback into the third object.

18. The non-transitory computer readable storage medium of claim 17, including further instructions that, when executed by the processing device, cause the processing device to:
responsive to an update to the first object, propagate, by the second node, the update to the third object using the callback; and
reevaluate the expression of the first object using the second node.

19. The non-transitory computer readable storage medium of claim 17, including further instructions that, when executed by the processing device, cause the processing device to notify one or more children nodes associated with the second node of the update.

20. The non-transitory computer readable storage medium of claim 16, wherein the first object represented by the object-oriented model comprises a hierarchical data structure.

* * * * *